US007526482B2

(12) United States Patent
Edwards et al.

(10) Patent No.: US 7,526,482 B2
(45) Date of Patent: *Apr. 28, 2009

(54) SYSTEM AND METHOD FOR ENABLING COMPONENTS ON ARBITRARY NETWORKS TO COMMUNICATE

(75) Inventors: Warren Keith Edwards, San Francisco, CA (US); Mark Webster Newman, San Francisco, CA (US); Trevor Smith, San Francisco, CA (US); Jana Zdislava Sedivy, Palo Alto, CA (US); Karen Marcelo, San Francisco, CA (US); Shahram Izadi, Oxon (GB); Jason Hong, Berkeley, CA (US)

(73) Assignee: Xerox Corporation, Norwalk, CT (US)

( * ) Notice: Subject to any disclaimer, the term of this patent is extended or adjusted under 35 U.S.C. 154(b) by 279 days.

This patent is subject to a terminal disclaimer.

(21) Appl. No.: 10/212,377

(22) Filed: Aug. 1, 2002

(65) Prior Publication Data

US 2004/0024787 A1    Feb. 5, 2004

(51) Int. Cl.
*G06F 17/30* (2006.01)
*G06F 15/173* (2006.01)
*H04W 4/00* (2009.01)

(52) U.S. Cl. .............. 707/10; 709/227; 455/426.1

(58) Field of Classification Search ............ 707/103 R, 707/10, 100, 102, 205; 709/227, 217, 245, 709/246; 455/426.1, 412

See application file for complete search history.

(56) References Cited

U.S. PATENT DOCUMENTS

| | | | | |
|---|---|---|---|---|
| 6,430,564 B1 * | 8/2002 | Judge et al. | ................. | 707/100 |
| 6,430,570 B1 * | 8/2002 | Judge et al. | ............. | 707/103 R |
| 6,559,773 B1 * | 5/2003 | Berry | ....................... | 340/815.4 |
| 6,779,004 B1 * | 8/2004 | Zintel | .......................... | 709/227 |
| 6,785,542 B1 * | 8/2004 | Blight et al. | ............. | 455/426.1 |
| 7,296,042 B2 * | 11/2007 | Edwards et al. | ............. | 707/205 |
| 7,415,537 B1 * | 8/2008 | Maes | ......................... | 709/246 |
| 2002/0101879 A1 * | 8/2002 | Bouret et al. | ............... | 370/465 |
| 2003/0172368 A1 * | 9/2003 | Alumbaugh et al. | ........ | 717/106 |
| 2006/0026677 A1 * | 2/2006 | Edery et al. | .................... | 726/22 |

OTHER PUBLICATIONS

U.S. Appl. No. 09/838,933, filed Apr. 20, 2001 by Edwards et al., titled "System and Method for Enabling Communication Among Arbitrary Components."

(Continued)

*Primary Examiner*—Etienne P LeRoux
*Assistant Examiner*—Susan Y Chen
(74) *Attorney, Agent, or Firm*—Park, Vaughan & Fleming, LLP

(57) ABSTRACT

A system for enabling components on arbitrary networks to communicate includes a plurality of arbitrary components, such as computers, servers, laptops, facsimile machines, copier machines and cellular telephones, including applications operating on those components, such as word processing or data base applications, connected together by one or more networks that may use the same or different protocols. A method includes a first component, such as a computer, obtaining aggregate objects from other components, such as a laptop or server. Each of the aggregate objects are associated with discovered component objects of the other components, such as the laptop or server. The first component selects at least one of the components associated with the aggregate objects, and invokes universal interfaces associated with the selected arbitrary components to communicate with other arbitrary components.

24 Claims, 12 Drawing Sheets

OTHER PUBLICATIONS

U.S. Appl. No. 10/052,585, filed Jan. 23, 2002 by Newman et al., titled "System and Method for Providing Context Information."

U.S. Appl. No. 10/058,268, filed Jan. 29, 2002 by Edwards et al., titled "System and Method for Enabling Arbitrary Components to Transfer Data Between Each Other."

U.S. Appl. No. 10/212,375 to Edwards et al., titled "A Method and System for Handling Data," filed concurrently herewith.

U.S. Appl. No. 10/212,376 to Edwards et al., titled "System and Method for Controlling Communication," filed concurrently herewith.

Bluetooth Consortium 2001, *Specification of the Bluetooth System*, Version 1.1 core, Table of Contents and Index (2001) [Retrieved from the Internet at http://www.bluetooth.com on Sep. 27, 2001].

Bluetooth Consortium 2001, *Specification of the Bluetooth System*, Version 1.1 core, Part C, pp. 184-252 (2001) [Retrieved from the Internet at http://www.bluetooth.com on Sep. 27, 2001].

Bluetooth Consortium 2001, *Specification of the Bluetooth System*, Version 1.1 core, Part D, pp. 255-330 (2001) [Retrieved from the Internet at http://www.bluetooth.com on Sep. 27, 2001].

Bluetooth Consortium 2001, *Specification of the Bluetooth System*, Version 1.1 core, Part E, pp. 332-392 (2001) [Retrieved from the Internet at http://www.bluetooth.com on Sep. 27, 2001].

Bluetooth Consortium 2001, *Specification of the Bluetooth System*, Version 1.1 core, Part F:1, pp. 394-424 (2001) [Retrieved from the Internet at http://www.bluetooth.com on Sep. 27, 2001].

Bluetooth Consortium 2001, *Specification of the Bluetooth System*, Version 1.1 core, Part F:4, pp. 512-534 (2001) [Retrieved from the Internet at http://www.bluetooth.com on Sep. 27, 2001].

Bluetooth Consortium 2001, *Specification of the Bluetooth System*, Version 1.1 core, Part H:2, pp. 782-796 (2001) [Retrieved from the Internet at http://www.bluetooth.com on Sep. 27, 2001].

Bluetooth Consortium 2001, *Specification of the Bluetooth System*, Version 1.1 core, Appendix III, pp. 914-922 (2001) [Retrieved from the Internet at http://www.bluetooth.com on Sep. 27, 2001].

N. Borenstein et al., "MIME (Multipurpose Internet Mail Extensions): Mechanisms for Specifying and Describing the Format of Internet Messages," pp. 1-77 (1992) [Retrieved from the Internet at http://www.oac.uci.edu/indiv/ehood/MIME/1521/rfc1521TOC.html on Sep. 14, 2001].

E. Christensen et al., *Web Services Description Language (WSDL) 1.1*, (Jan. 23, 2001) [Retrieved from the Internet at http://msdn.miscrosoft.com/xml/general/wsdl/asp. on Sep. 27, 2001].

N. Cutland, *Computability*, Cambridge University Press, pp. 7-42 (1980).

A. Dey et al., "A Conceptual Framework and a Toolkit for Supporting the Rapid Prototyping of Context-Aware Applications," *Human Computer Interaction Journal*, 16:1-67 (2001).

P. Dourish et al., "Extending Document Management Systems with User-Specific Active Properties," *ACM Transactions on Information Systems*, Xerox Palo Alto Research Center, pp. 1-27 (2000).

N. Economides, "The Economics of Networks," *International Journal of Industrial Organization*, 14:2, pp. 1-36 (1996).

W. K. Edwards, "Session Management for Collaborative Applications," *Proceedings of ACM Conference on Computer-Supported Cooperative Work (CSCW '94)*, Georgia Institute of Technology, Chapel Hill, NC, (1994).

A. Fox et al., "Integrating Information Appliances into an Interactive Space," *IEEE Computer Graphics and Applications*, Stanford University, 20:3, pp. 54-65 (2000).

E. Gamma et al., *Design Patterns: Elements of Reusable Object-Oriented Software*, Addison-Wesley, pp. 1-31 (1995).

Y. Goland et al., *Simple Service Discovery Protocol/1.0; Operating Without and Arbiter*, Internet Engineering Task Force Internet Draft (1999) [Retrieved from the Internet at http://www.upnp.org/draft_cai_sssdp_vl_03.txt on Sep. 14, 2001].

C. Gray et al., "Leases: An Efficient Fault-Tolerant Mechanism for Distributed File Cache Consistency," *Proceedings of the 12th ACM Symposium on Operating Systems Principles (SOSP)*, Association of Computing Machnines, pp. 202-210 (1989).

*User Interface Markup Language 2.0 Draft Specification*, Harmonia, Inc., pp. 1-64, (2000) [Retrieved from the Internet at http://www.uiml.org/specs.uim12/index.htm on Sep. 14, 2001].

T. Hodes et al., "A Document-Based Framework for Internet Application Control," *Proceedings of the Second USENIX Symposium on Internet Technologies and Systems (USITS)*, USENIX Association, Boulder, CO, pp. 59-70 (1999).

D. Iseminger, *COM + Developer's References*, Microsoft Press, pp. 1-6 (2000).

E. Kiciman et al., "Using Dynamic Mediation to Integrate COTS Entities in a Ubiquitous Computing Environment," *Proceedings of the Second International Symposium on Handheld and Ubiquitous Computing (HUC)*, Stanford University (2000).

G. Kiczales et al., *The Art of the Metaobject Protocol*, MIT Press, pp. 12-46 (1991).

T. Kindberg et al., "A Web-Based Nomadic Computing System," *HP Labs Technical Report HPL-2000-110*, pp. 1-13 (2000) [Retrieved from the Internet at http://cooltown.hp.com/papers/nomadic.htm on Sep. 14, 2001].

[Author Unknown] "Plug and Play Specifications," Microsoft Corp., (1999) [Retrieved from the Internet at http://www.microsoft.com/HWDEV/respec/pnpspecs.htm on Sep. 14, 2001].

[Author Unknown] "Universal Plug and Play," Microsoft Corp. (2000) [Retrieved from the Internet at http://msdn.microsoft.com/library/psdk/upnp/upnpport_6zz9 on Sep. 27, 2001].

[Author Unknown]"C# Language Specification," Microsoft Corp., Microsoft Press, pp. 1-41 (2001).

W. Newman et al., "Cam-Works: A Video-based Tool for Efficient Capture from Paper Source Documents," *Proceedings of the International Conference on Multimedia Computing and Systems*, Florence, Italy, vol. 2, pp. 647-653 (1999).

J. Ockerbloom, *Mediating Among Diverse Data Formats*, Ph.D. thesis, Carnegie Mellon University, pp. 1-150 (1999).

[Author Unknown] "White Paper: Salutation Architecture: Overview," Salutation Consortium (1998) [Retrieved from the Internet at http://www.salutation.org/whitepaper/originalwp.pdf on Sep. 27, 2001].

E. Saund, "Bringing the Marks on a Whiteboard to Electronic Life," *Cooperative Buildings: Integrating Information, Organizations, and Architecture, Second International Workshop*, Xerox Palo Alto Research Center (1999).

[Author Unknown] "JavaBeans Specification," Sun Microsystems, pp. 1-114 (1997) [Retrieved from the Internet at http://ja-va.sun.com/products/javabeans/docs/beans.101.pdf on Sep. 14, 2001].

[Author Unknown] "Jini Discovery and Join Specification," Sun Microsystems, pp. 1-32 (1999).

[Author Unknown] "UDDI Technical Whitepaper," Universal Description, Discovery, and Integration Consortium, pp. 1-12 (2000) [Retrieved from the Internet at http://www.uddi.org/pubs/Iru_UDDI_Technical_White_Paper.PDF on Sep. 14, 2001].

B. Venners, *Jini Service UI Draft Specification* (2000) pp. 1-25 [Retrieved from the Internet at http://www.artima.com/jini/serviceui/DraftsSpec.html on Sep. 27, 2001].

J. Waldo, "The Jini Architecture for Network-centric Computing," *Communications of the ACM*, 42:7, pp. 76-82 (1999).

M. Weiser et al., "Designing Calm Technology" (1995) pp. 1-5 [Retrieved from the Internet at http://www.fxpal.com/ConferencesWorkshops/chi97/white-papers/Mark%2520Weiser.html on Oct. 10, 2001].

A. Wollrath et al., "A Distributed Object Model for the Java System," *USENIX Computing Systems*, vol. 9 (1996).

*Jini™ Architectural Overview Technical White Paper*, Sun Microsystems, Inc., Palo Alto, California, pp. 1-23 (1999).

*Jini™ Technology Glossary*, Sun Microsystems, Inc., Palo Alto, California, pp. 479-499 (2000).

*Jini™ Device Architecture Specification*, Sun Microsystems, Inc., Palo Alto, California, pp. 1-14 (2000).

*JavaSpaces™ Service Specification*, Sun Microsystems, Inc., Palo Alto, California, pp. 1-24 (2000).

*Jini™ Technology Core Platform Specification*, Sun Microsystems, Inc., Palo Alto, California, pp. 1-126 (2000).

*A Collection of Jini™ Technology Helper Utilities and Services Specifications*, Sun Microsystems, Inc., Palo Alto, California, pp. 1-214 (2000).

*Universal Description Discovery and Integration Data Structure Reference V1.0*, Ariba, Inc. and International Business Machines Corporation and Microsoft Corporation, pp. 1-31 (2000).

*Universal Description, Discovery and Integration Programmer's API 1.0*, Ariba, Inc., International Business Machines Corporation and Microsoft Corporation, pp. 1-67 (2000).

*Universal Description, Discovery and Integration Technical White Paper*, Ariba, Inc., International Business Machines Corporation and Microsoft Corporation, pp. 1-12 (2000).

*Mapping Salutation Architecture APIs to Bluetooth Service Discovery Layer*, Version 1, IBM Corp., pp. 1-26 (1999).

*Bluetooth Protocol Architecture*, Version 1, Nokia Mobile Phones, pp. 1-20 (1999).

W. Edwards et al., "At Home with Ubiquitous Computing: Seven Challenges," *G.D. Abowd, B. Brumitt, S.A.N. Shafer (Eds.): Ubicomp 2001, LNCSA 2201*, pp. 256-272, (2001).

\* cited by examiner

SYSTEM AND METHOD FOR ENABLING COMPONENTS ON ARBITRARY NETWORKS TO COMMUNICATE

FIELD OF THE INVENTION

This invention relates generally to communication systems and methods and, more particularly, to a system and method for enabling components on arbitrary networks to communicate using aggregate objects employing mobile code.

BACKGROUND OF THE INVENTION

In data communication environments, many different vendors provide a number of products for specific services. A machine, an application operating on a machine, and a software module or a file system residing on a machine ("component") developed by one vendor might have difficulty communicating with a component developed by another. Domain-specific protocols have been developed to partially deal with this difficulty by enabling components to communicate with each other using a common language. But since new components are constantly being introduced into and taken out of an environment it has been difficult to develop a system or protocol that is not domain-specific yet is sufficiently robust to enable unknown, arbitrary components to enter the environment and communicate with each other without having to be programmed explicitly in advance.

Further, some components might be aggregate components, which represent "collection-like" entities. These might be co-located on the same machine as other components, or accessed remotely over a network. Further, the aggregate components might include a number of entities, such as fileservers, nameservers, network bridges and gateways, and software modules that perform new discovery protocols, which may logically "contain" files, names, and the hosts and components accessible via the new network or protocol, respectively. But in order to use these entities, developers must have specific prior knowledge about the programmatic interfaces for these entities. When a new type of collection-like or aggregate component is introduced, the other components must be reprogrammed to allow them to access the new collection and the entities contained within it. Thus, components that desire taking advantage of multiple protocols, networks, services, search mechanisms, file servers, and other entities that provide such "collection-like" behavior, must be created with knowledge of each and cannot incorporate new technologies without expensive reprogramming and labor-intensive manual upgrades.

SUMMARY OF THE INVENTION

A system in accordance with embodiments of the present invention includes a first component with a first aggregate object associated with at least one of a plurality of components. The at least one component is associated with at least one universal interface. Further, the universal interface has at least one instruction which when executed enables the first component to communicate with the at least one component.

A method and a program storage device readable by a machine and tangibly embodying a program of instructions executable by the machine in accordance with embodiments of the present invention includes obtaining a first aggregate object from a first component of a plurality of components. The obtained first aggregate object is associated with at least one of the components. At least one of the components associated with the first aggregate object is selected, and at least one of a plurality of universal interfaces associated with the at least one selected component is invoked to communicate with at least one other of the components.

The present invention provides a system by which arbitrary components can easily communicate with each other without requiring that the components be explicitly programmed to understand each other's protocols. Further, the present invention enables components on different networks to communicate without requiring prior programming of either of the components, and allows components to dynamically discover and search for other components existing on different networks. Still further, the present invention allows components to communicate with other collection-like components, such as file systems.

DETAILED DESCRIPTION OF THE INVENTION

Figure 1:
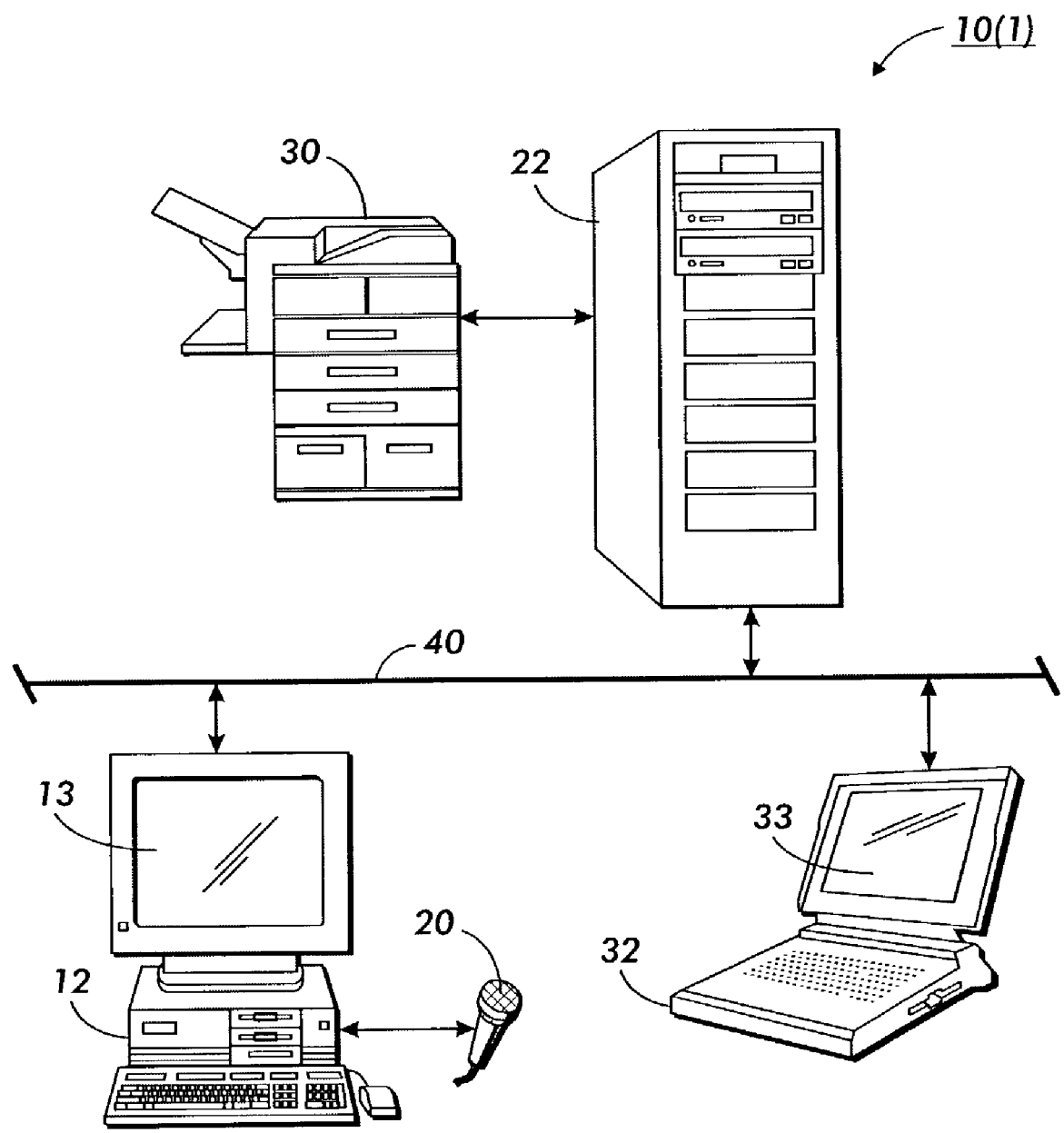
FIG. 1 is a diagram of a system for enabling components on arbitrary networks to communicate in accordance with embodiments of the present invention.
Figure 2:
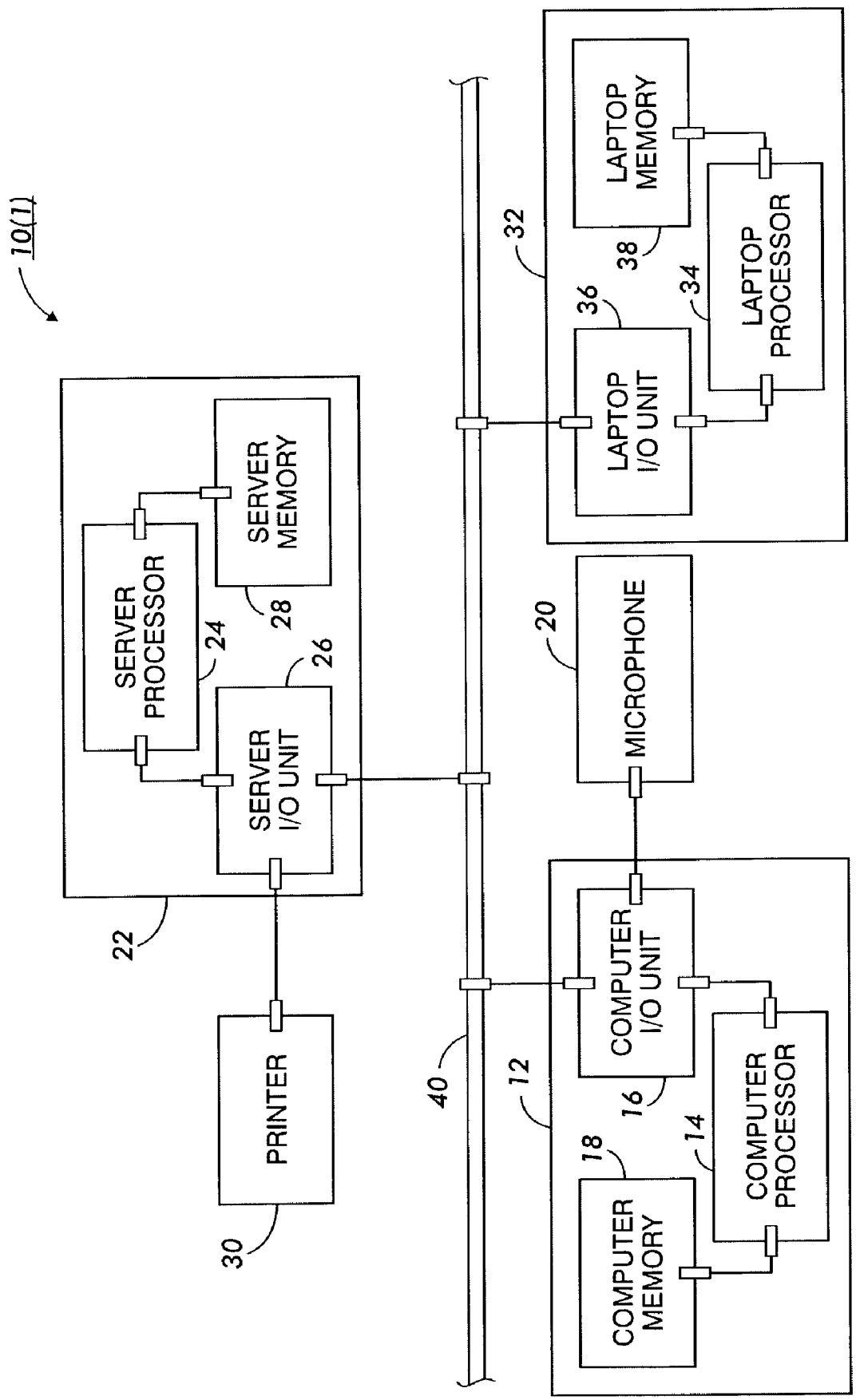
FIG. 2 is a block diagram of the system shown in FIG. 1.

A system 10(1) for enabling components on arbitrary networks to communicate in accordance with embodiments of the present invention is shown in FIGS. 1-2. In embodiments of the present invention, system 10(1) includes computer 12, server 22 and laptop 33 ("components"), although the system 10(1) may include different kinds and numbers of components. The components in system 10(1) may use an aggregate interface to communicate with aggregate or individual components that may be located on a first network 40 or a second network 50.

The present invention provides a system 10(1) by which arbitrary components can easily communicate with each other without requiring that the components be explicitly programmed to understand the protocols each uses to communicate. Further, the present invention enables components on a first network 40 to communicate with components on a second network 50 without requiring either of the components on networks 40, 50 to have a priori knowledge of the other's network protocol. Moreover, the present invention allows components to dynamically discover and search for other components existing on the first network 40 or the second network 50. Still further, the present invention allows components to communicate with other collection-components, such as file systems, and the entities logically contained therein without explicit prior programming.

Computer 12 comprises a personal desktop computer, such as an IBM PC® using a Windows® operating system ("OS") platform, although computer 12 may comprise a Macintosh® or SUN Microsystems® computer using a Macintosh® or SunOS® OS platform, respectively, although other types and numbers of components can be used. Computer 12 includes a computer processor 14, a computer I/O unit 16, a computer memory 18 and mechanisms for reading data stored in the memory 18, which are coupled together by one or more buses, although other coupling techniques may be used. These elements are used by computer 12 to store and process instructions in accordance with embodiments of the present invention as described and illustrated further herein.

The memory 18 is volatile memory, although non-volatile memory may also be used. The volatile memory comprises random access memory, although dynamic random access memory or flash memory may be used, while the non-volatile memory comprises a fixed data storage medium such as a hard-disk, although a portable data storage medium may be used, such as a floppy-disk, compact-disc, digital-video disc, magnetic tape or optical disk. The memory 18 stores instructions and data for performing the present invention for execution by the processor 14, although some or all of these instructions and data may be stored elsewhere.

The computer I/O unit 16 has one or more ports to connect computer 12 to the network 40 using a line based medium such as coaxial cable, although the I/O unit 16 may also include ports capable of receiving wireless signals, such as RF or infrared, to enable the computer 12 to communicate with the network 40. Since components such as computer 12 are well known in the art, the specific elements, their arrangement within computer 12 and operation will not be described in further detail herein.

Microphone 20 comprises a device that can convert sound into audio signals for processing by computer 12, although other types and numbers of components can be used. The microphone 20 is coupled to the computer 12 at a port in the computer I/O unit 16 using a line-based medium, although wireless mediums may be used. Since components such as microphone 20 are well known in the art, the specific elements, their arrangement within microphone 20 and operation will not be described in further detail herein.

Server 22 comprises a general purpose computer and server system that performs a variety of functions such as data storage, file management and network routing, although other types and numbers of components can be used. Server 22 includes a server processor 24, a server I/O unit 26, a server memory 28 and mechanisms for reading data stored in the memory 28, which are coupled together by one or more buses, although other connection techniques may be used. These elements are used by server 22 to store and process instructions in accordance with embodiments of the present invention as described and illustrated further herein.

The same types of volatile and non-volatile memory used by computer 12 may be used by server 22. The memory 28 stores instructions and data for performing the present invention for execution by the processor 14, although some or all of these instructions and data may be stored elsewhere. The server I/O unit 26 has one or more ports to connect the server 22 to the network 40 using a line based medium, such as coaxial cable, although the I/O unit 26 may also include ports capable of receiving wireless signals, such as RF or infrared, to enable the server 22 to communicate with the network 40. Since components such as server 22 are well known in the art, the specific elements, their arrangement within server 22 and operation will not be described in further detail herein.

Printer 30 comprises a printing device capable of rendering graphical and/or textual representations on a printing medium, although other types and numbers of components can be used. The printer 30 is coupled to the server 22 at a port in the server I/O unit 26 using a line-based medium, although wireless mediums may be used. Since devices such as printer 30 are well known in the art, the specific elements, their arrangement within printer 30 and operation will not be described in detail here.

Laptop 32 comprises a portable computing device that performs a variety of functions such as word processing, information processing and display, electronic messaging, telephony, facsimile transmissions or networking, although other types and numbers of components can be used. Laptop 32 includes a laptop processor 34, a laptop I/O unit 36, a laptop memory 38 and mechanisms for reading data stored in the memory 38, which are coupled together by one or more buses, although other coupling techniques may be used, and used by the laptop 32 to store and process instructions in accordance with embodiments of the present invention as described and illustrated further herein.

The same types of volatile and non-volatile memory used by computer 12 may be used by laptop 32 to the extent size constraints of laptop 32 permits. The memory 38 stores instructions and data for performing the present invention for execution by the processor 34, although some or all of these instructions and data may be stored elsewhere.

The laptop I/O unit 36 has one or more ports to connect laptop 32 to the network 40 using a line based medium, such as coaxial cable, although the unit 36 may also include ports capable of receiving wireless signals, such as RF or infrared, to enable the laptop 32 to communicate with the network 40. Since components such as laptop 32 are well known in the art, the specific elements, their arrangement within laptop 32 and operation will not be described in further detail herein.

Components, such as computer 12, microphone 20, server 22, printer 30 and laptop 32, are provided for exemplary purposes only. In embodiments of the present invention, the components can comprise any type of device or system that can store, process and execute instructions for performing one or more methods of the present invention as described and illustrated herein, although the components may also comprise executable programs or other types of software entities that may be executed by or reside in a memory of a hardware device or system. By way of example only, the components shown in FIG. 1 may also comprise scanners, PDAs, display devices, video input devices, audio output devices, remote control devices, appliances and file systems or databases residing in a computer system.

First network 40 comprises a public network, such as the Internet, which includes one or more local area networks ("LANs"), such as Ethernet™ networks, wide area networks ("WANs") and telephone line networks, although other types of public or private networks may be used, such as a proprietary organizational network spread out over several geographical locations. Moreover, first network 40 enables computer 12, server 22 and laptop 32 to communicate with each other and any other components with access to the first network 40.

The operation of the system 10(1) for enabling components on arbitrary networks to communicate in accordance with embodiments of the present invention will now be described with reference to FIGS. 3-6. By way of example only and referring to FIG. 4, a user of the computer 12 may be operating an application 110 executing on the computer 12, such as a word processing program, and may need to print a document stored in the computer memory 18. As shown in FIG. 1, the computer 12 is not connected to a printing device, but the server 22 is connected to a printer 30. Further in this example, the computer 12 is not programmed to be able to access the printer 30 in order to print documents because a printer driver particular to the printer 30 has not been installed in the computer 12.

Figure 3:
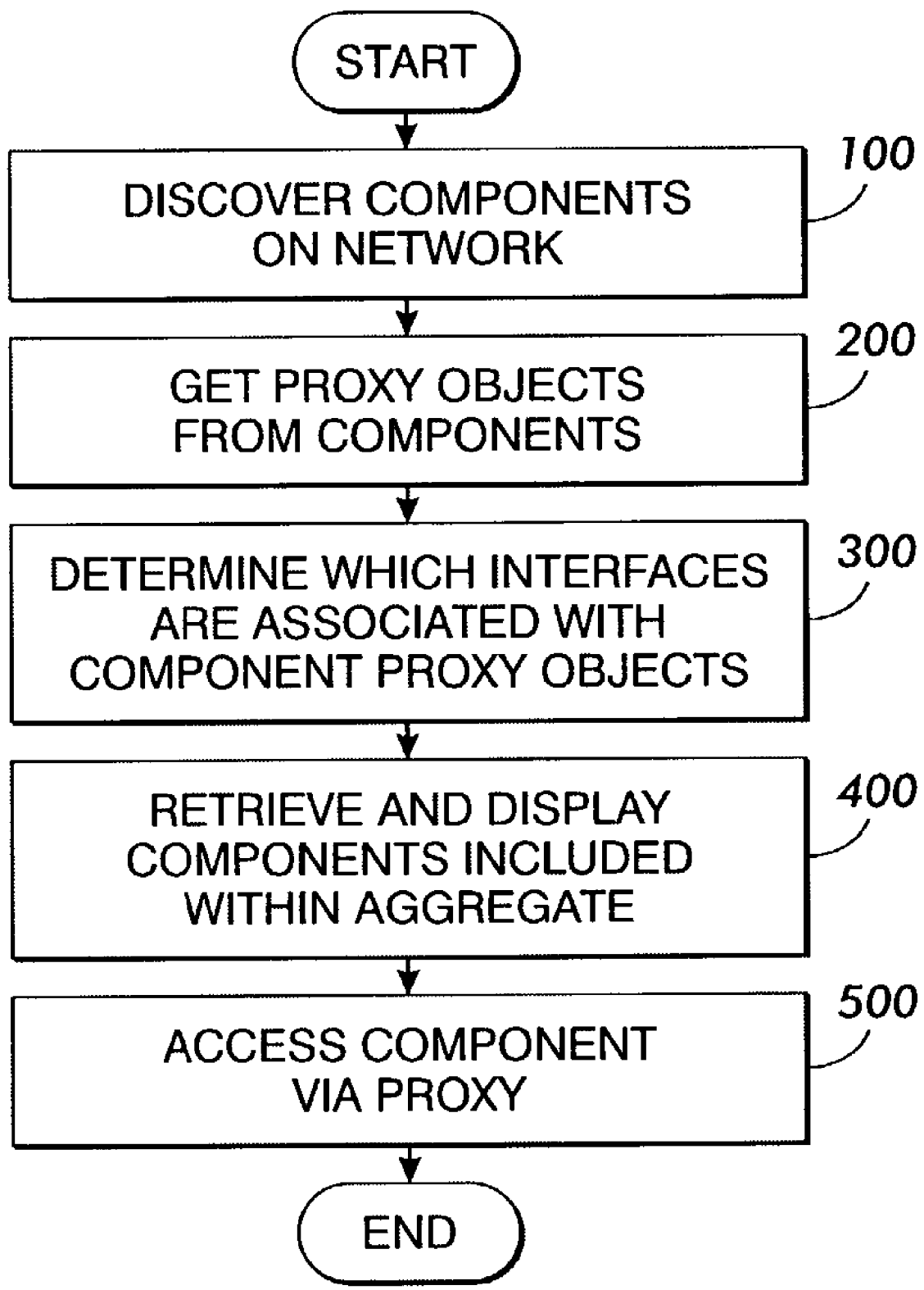
FIG. 3 is a flow chart of a process for enabling components on arbitrary networks to communicate in accordance with embodiments of the present invention.

Thus, referring to FIG. 3 and beginning at step 100, computer 12 performs a discovery process to determine which components are present on the network 40 and what their communication capabilities are, although the computer may inspect itself to determine which components or component aggregations it is associated with when computer 12 does not have access to the network 40 or a discovery protocol, for example. The computer 12 may be programmed to automatically perform this discovery process upon the user requesting a service or expressing a desire to establish a particular type of data transfer session, such as transferring stored files to a printing device to be printed thereon, although the computer 12 may be programmed to allow the user to manually initiate the discovery process, an example of which will be described further herein in connection with step 600. In embodiments of the present invention, computer 12 at least discovers server 22 and laptop 32 using a Jini™ system discovery protocol, although a number of other protocols may be used such as UDDI or a simple lookup in a name server, for example, as disclosed in U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29, 2002, which is hereby incorporated by reference in its entirety.

At step 200, server 22 returns a server proxy object (not illustrated) to the computer 12, and the laptop 32 returns a laptop proxy object (not illustrated) to the computer 12, and both are stored in computer memory 18. Each proxy object includes references to one or more universal interfaces associated with the particular component the proxy object is received from, such as server 22 and laptop 32, thereby making the interfaces and their respective operations, instructions and data accessible to the receiving component, such as computer 12.

In embodiments of the present invention, the server and laptop proxy objects and their associated interfaces, operations, instructions and data comprise mobile code, such as JAVA, although other languages may be used such as Smalltalk, CLOS, Ada, or Object Pascal. Mobile code is executable data that can be transmitted to the computer 12, server 22 and laptop 32 where it may be executed. In embodiments of the present invention, the mobile code is object-oriented, which is a programming methodology that is well known in the computer programming arts where data types, often referred to as classes, may be defined along with associated procedures or sets of instructions, although the mobile code may be procedure-oriented, logic-oriented, rule-oriented or constraint-oriented.

In embodiments of the present invention, the computer 12 includes basic interface semantic programming 310, shown in FIG. 4, which includes programming instructions the computer 12 has stored in its memory 18 that may be executed to understand the semantics of a basic set of universal interfaces associated with the proxy objects and their associated operations, instructions, and data, which will be described in further detail herein. The particular universal interfaces used are responsive to the needs of the application 110 for particular services, such as printing a file being operated on by a word processing program. However, the basic interface semantic programming 310 does not need to include the particulars of the specific services involved, only the semantics of the universal interfaces used in embodiments of the present invention as described further herein below.

In embodiments of the present invention, server 22 and laptop 32 each have stored in their respective memory 28, 38, or otherwise have access to ("associated with"), and may implement, an aggregation interface, although the server 22 and laptop 32 may each also implement a variety of other interfaces, such as a data source interface, data sink interface, contextual interface, a notification interface and a user interface, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which is hereby incorporated by reference in its entirety.

The aggregation interface includes operations, instructions and data that are specific to a component they are associated with, such as server 22 and laptop 32, but may be understood and executed by a component having access to them, such as computer 12. In this example, the computer 12 executes these operations, instructions and data to access a component aggregation associated with a component, such as server 22 and laptop 32. A component aggregation is a collection of one or more other components, and each component within an aggregation may itself form a collection of one or more components, and so on. In embodiments of the present invention, the aggregation interface includes a number of operations, such as an enumerate ( ), get ( ), contains ( ) and add ( ) operation, and each may be passed one or more parameters, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety.

At step 300, computer 12 executes instructions according to the basic interface semantic programming 310, which instructs the computer 12 to inspect each received proxy object, such as the server and laptop proxy objects, to determine which universal interfaces server 22 and laptop 32 are associated with, although the computer 12 may inspect the proxy object received from components included within the computer root aggregate object 430. Computer 12 determines that the server proxy object is associated with at least an aggregation interface and can provide computer 12 with mobile code instructions that may be executed for accessing aggregations, which will be described in further detail herein. Moreover, the computer 12 determines that the laptop proxy object is also associated with at least an aggregation interface and can provide computer 12 with mobile code instructions that may be executed by computer 12 to access aggregations, which will also be described in further detail herein.

At step 400, computer 12 invokes the aggregation interface associated with server 22 and invokes the aggregation interface associated with the laptop 32, although the computer 12 may invoke one or more other universal interfaces implemented by one or more of the proxy objects, such as a data source interface. The computer 12 executes an enumerate ( )

operation included in each aggregation interface, passing to it a context parameter to provide server 22 and laptop 32 with the identity of computer 12 for security purposes or record keeping. The context parameter includes information that describes the particular component it is associated with, such as computer 12 in this example. The instructions associated with the enumerate ( ) operation, which when executed by the computer 12, are specific to the component associated with the operation, such as server 22 and the laptop 32 in this example. Executing these instructions enables computer 12 to request an proxy objects from each of the components discovered at step 100, such as server 22 and laptop 32.

Figure 4:
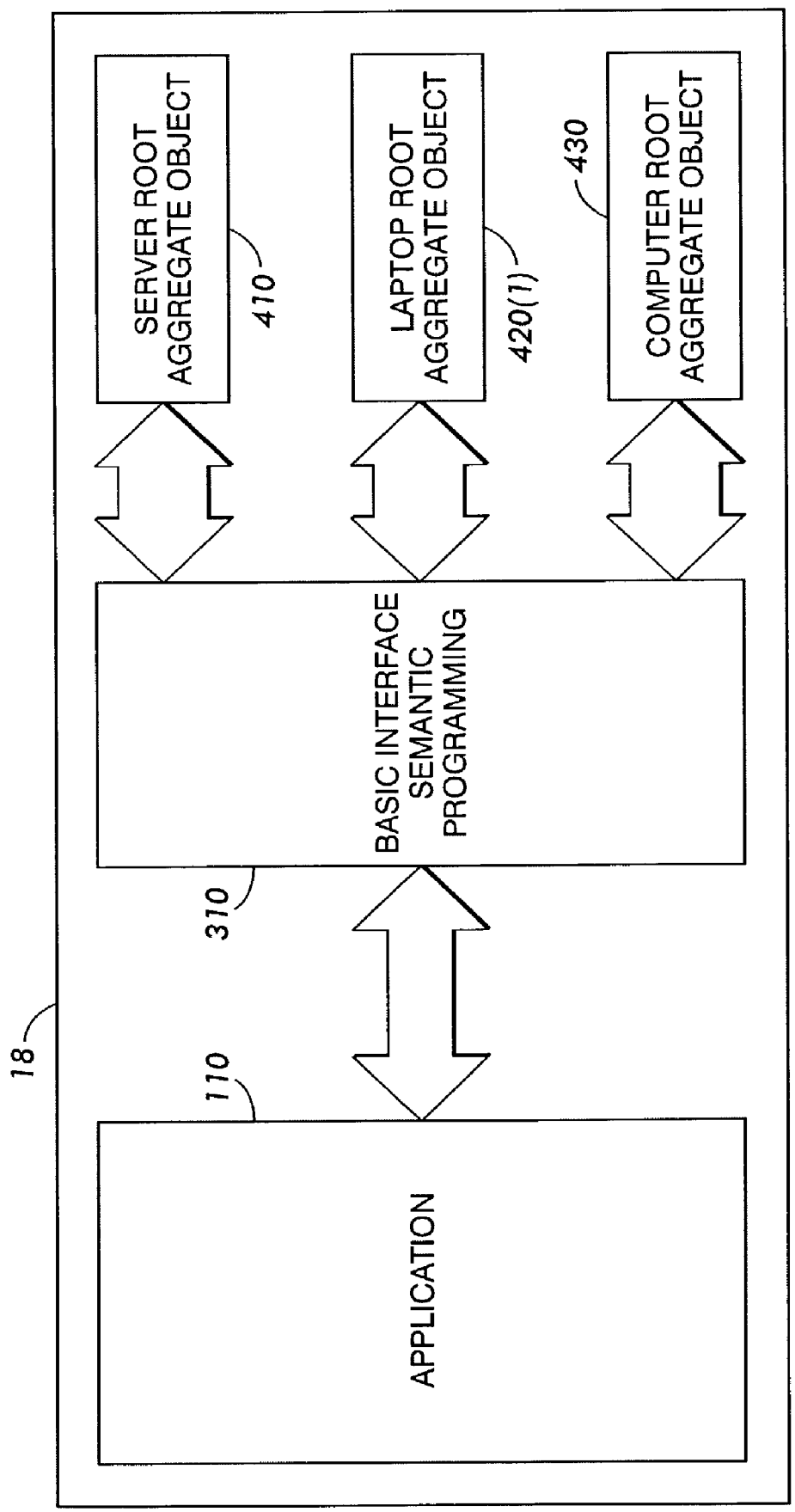
FIG. 4 is functional block diagram of a memory used in a system for enabling components on arbitrary networks to communicate.
Figure 5:
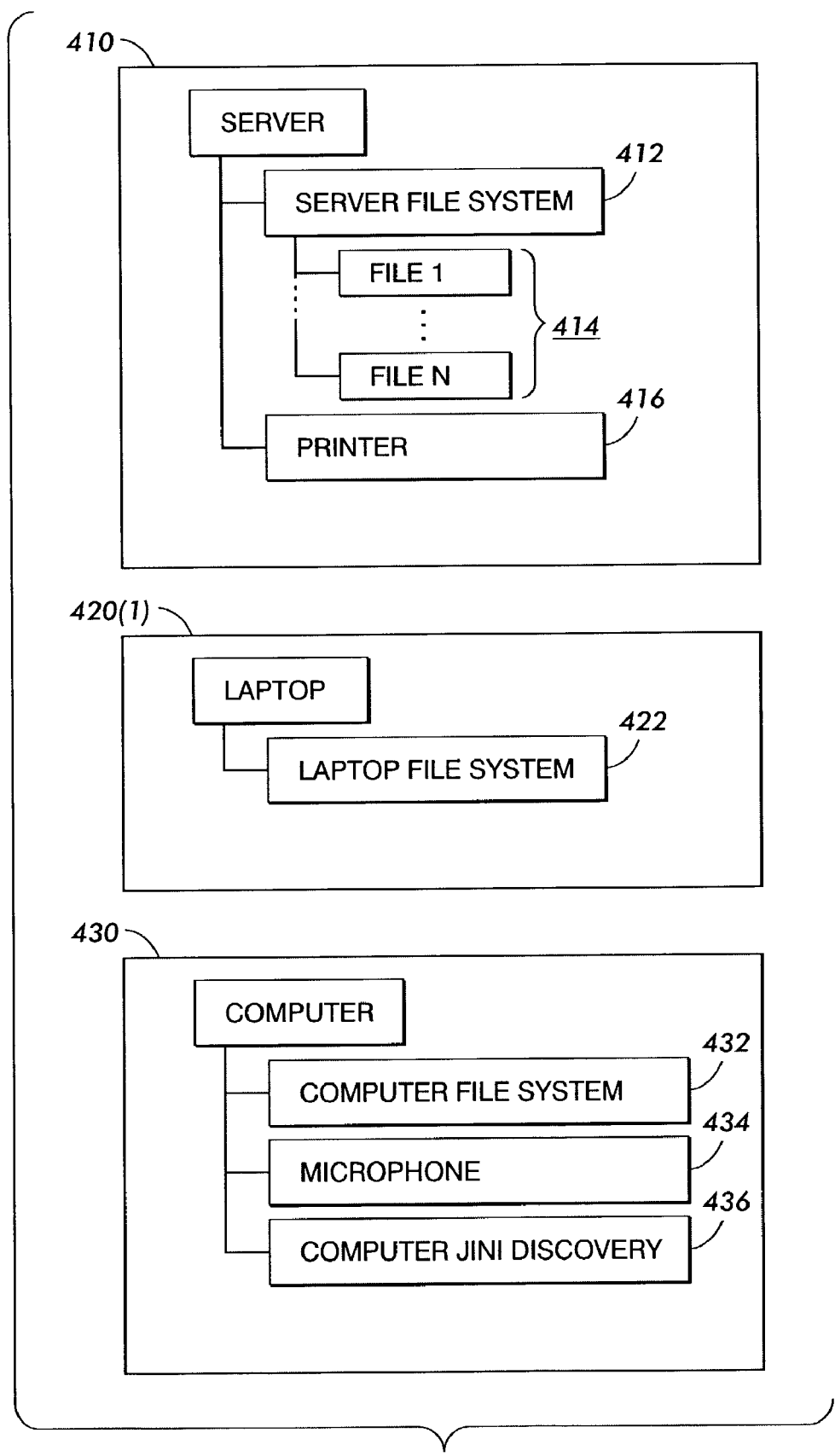
FIG. 5 is a diagram of aggregate root objects used in the system for enabling components on arbitrary networks to communicate.

Referring to FIGS. 4-5, server 22 creates a server root aggregate object 410 and laptop 32 creates a laptop root aggregate object 420(1). In embodiments of the present invention, the server 22 uses the discovery protocols it has been programmed to implement to discover which local components and remote components it has access to. In this example, the server 22 uses the Jini™ system discovery protocol to discover the components, although other protocols may be used, as described above in connection with step 100. The server 22 discovers local components, such as printer 30, and remote components available on the network 40, such as laptop 32. The server root aggregate object 410 does not show an aggregation object representing the laptop 32 since the computer 12 will separately request and receive a laptop root aggregate object 420(1), although the server root aggregate object 410 may also include a laptop aggregation object. As discussed above in connection with step 200, each of the components associated with the server 22, such as the server file system aggregate component object 412, may be an aggregation of other components, such as individual file objects 414. In embodiments of the present invention, the individual file objects 414 in the server file system aggregate component object 412 may be located on another remote machine, such as laptop 32. But the printer component object 416 that is associated with the server 22 is an individual component in this example.

The laptop 32 creates the laptop root aggregate object 420(1) in the same manner that the server 22 creates the server root aggregate object 410 as discussed above, except the laptop 32 uses the discovery protocol it has been programmed to implement, which in this example is the Jini™ system discovery protocol, although other protocols may be used. The laptop 32 discovers local components such as laptop file system object 422, and remote components available on the network 40, such as server 22, which is not illustrated in the laptop root aggregate object 420(1) for the same reason the laptop aggregation object 420(1) was not illustrated in the server root aggregate object 410. Computer 12 receives the server root aggregate object 410 and the laptop aggregate object 420(1), which are stored in memory 18.

The computer 12 creates the computer root aggregate object 430 in the same manner that the server 22 creates the server root aggregate object 410 as discussed above, except the computer 12 uses the discovery protocols it has been programmed to implement, which in this example is the Jini™ system discovery protocol, although other protocols may be used. The computer 12 discovers local aggregation components, such as computer file system object 432 and, local individual components, such as microphone 434, which are not illustrated in the server aggregate object 410 and the laptop root aggregate object 420(1) for the same reason the laptop aggregation object 420(1) was not illustrated in the server root aggregate object 410.

The aggregate root objects 410, 420(1), 430 include data, instructions, operations and protocols that are particular to the component they are associated with, such as server 22, laptop 32 and computer 12. These aggregate root objects 410, 420 (1), 430 may be understood and executed by the computer 12 to communicate with the components associated with those root objects, such as the individual file objects 414 associated with the server file system aggregate component object 412, the printer component object 416, or the microphone component object 434 associated with the computer 12, using one or more universal interfaces associated with those components, as described in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety.

Figure 6:
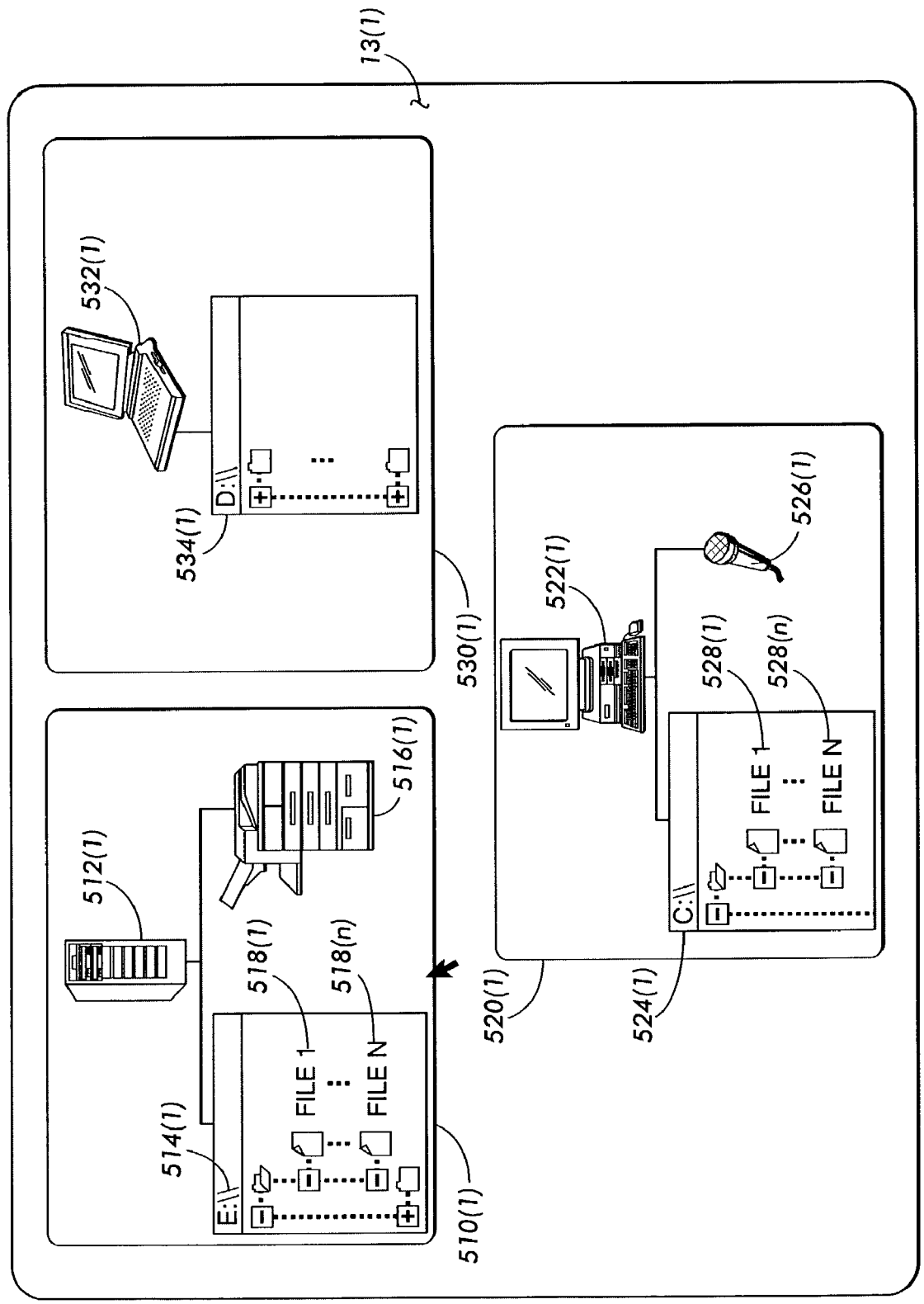
FIG. 6 is an exemplary display showing component icons used in the system for enabling components on arbitrary networks to communicate.

At step 500 and referring to FIG. 6, computer 12 may be programmed to access each of the aggregate root objects 410, 420(1), 430 to communicate with the associated components and component aggregates in a variety of ways. By way of example only, the computer 12 may be programmed to display on the computer display 13(1) a server aggregation window 510(1), a computer aggregation window 520(1) and a laptop aggregation window 530(1). The server aggregation window 510(1) includes a server icon 512(1), a server file system icon 514(1), and a printer icon 516(1), although different numbers and types of icons may be used. The computer aggregation window 520(1) includes a computer icon 522(1), a computer file system icon 524(1), computer file icons 528 (1)-528(*n*), and a microphone icon 526(1), although different numbers and types of icons may be used. The laptop aggregation window 530(1) includes a laptop icon 532(1) and a laptop file system icon 534(1), although different numbers and types of icons may be used. Further, a number of user interfaces may be used besides graphical windows and icons, such as command line and audio interfaces. Moreover, computer 12 may also respond to programming events occurring in application 110 shown in FIG. 4, instead of responding to direct user input.

In this example, the computer 12 may be programmed to associate the server icon 512(1), the computer icon 522(1) and the laptop icon 532(1) with components, such as server 22, computer 12 and the laptop 32, respectively, while the icons associated with each of these icons 512(1), 522(1), 532(1) represent the components or aggregations within those components 22, 12, 32, respectively. Moreover, the computer 12 may invoke one or more interfaces to effect different types of communications among components responsive to user interaction with the icons. For instance, a user of computer 12 may manipulate a user input device, such as a mouse, to select and "drag" the computer file icon 528(1) across the display 13(1) towards the printer icon 516(1), and then "dropping" the file icon 528(1) by releasing a mouse button, for example. Further, the computer 12 may be programmed to respond to user input by invoking various interfaces, such as a data sink interface associated with the printer 30, to establish communication between the computer 12 and printer 30. The computer 12 can provide the printer 30 with data, such as a word processing file, so the printer 30 can render the contents of the file.

An alternative embodiment of system 10(1) will now be described with reference to FIGS. 1, 3 and 5. In this embodiment, step 100 is performed as described above, except computer 12 is programmed to only be able to access the computer root aggregate object 430, which in this embodiment also includes a computer JINI discovery aggregate object 436, as shown in FIG. 5. The computer 12 inspects the contents of the computer root aggregate object 430 to determine which components or component aggregates are available in the object 430. Next, the computer 12 performs step 200, except computer 12 receives proxy objects from the components or component aggregates included in the computer root aggregate object 430, such as the computer file system object 432, the microphone object 434, and the JINI discovery aggregate object 436. Thus, the computer 12 receives a computer file system proxy object (not illustrated), a microphone proxy object (not illustrated), and a JINI proxy object (not illustrated), from the computer root aggregate object 430.

Next, the computer 12 performs step 300, except the computer 12 determines which interfaces are implemented by the computer file, microphone and JINI proxy objects. Moreover, computer 12 determines that at least one of the proxy objects, such as the JINI proxy object, implements the aggregation interface. Next, computer 12 performs step 400, except computer 12 inspects the contents of the JINI proxy object by invoking the enumerate ( ) operation on the aggregation interface implemented by the JINI proxy object, and step 200 is repeated as described herein, except the computer 12 receives proxy objects from components included in the JINI discovery aggregate object 436, such as a printer device proxy object (not illustrated), for example. Next, computer 12 repeats step 300, except the computer 12 determines which interfaces are implemented by the printer device proxy device object. Moreover, the computer 12 determines that the printer device proxy device object does not implement the aggregation interface. Thus, computer 12 skips step 400 and performs step 500 to access the printer device via the printer device proxy device object using one or more universal interfaces associated with the printer device, such as a data sink interface.

An alternative embodiment of system 10(1) will now be described. Like reference numbers in FIGS. 7-13 are identical to those in and described with reference to FIGS. 1-6, except in this embodiment, system 10(2) further includes a cellular phone 44, copier machine 46 and a facsimile machine 48, which are coupled together by a second network 50.

Figure 8:
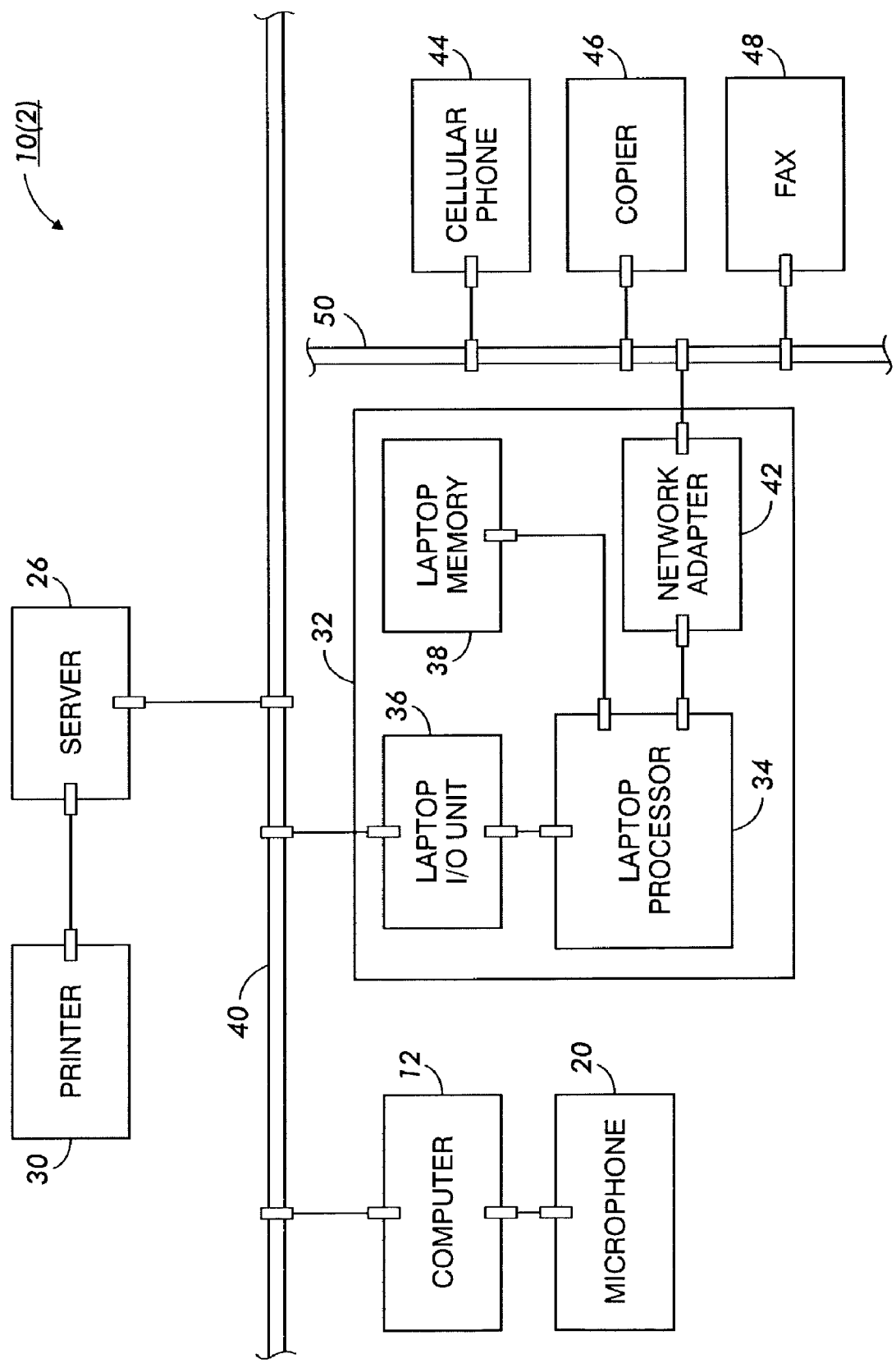
FIG. 8 is a block diagram of the system shown in FIG. 7.

As shown in FIG. 8, the laptop 32 in system 10(2) is the same as the laptop 32 in system 10(1), except it further includes a network adapter 42, which is connected to the laptop processor 34. The network adapter 42 is capable of sending and receiving wireless signals, such as radio or infrared, to enable the laptop 32 to communicate with the second network 50, and hence the cellular phone 44, copier machine 46 and facsimile machine 48, although the adapter 42 may be capable of receiving wire-based signals.

Cellular phone 44 comprises a portable communication device that can send and receive cellular and other wireless transmissions, such as radio waves. Further, cellular phone 44 includes software and/or hardware to enable the phone 44 to communicate with the second network 50. Since the components, the connections between components and their operation in cellular phone 44 is well known in the art, they will not be described in detail here.

Copier machine 46 comprises a network photocopier device that includes software and/or hardware to enable the copier 46 to communicate with the second network 50 to receive data, such as files for rendering. Since the components, the connections between components and their operation in the copier 46 is well known in the art, they will not be described in detail here.

Facsimile machine 48 comprises a device that can send and receive facsimile transmissions containing text and/or graphics. The facsimile machine 48 includes software and/or hardware to enable the machine 48 to communicate with the second network 50 for receiving data, such as files for creating facsimile transmissions. Since the components, the connections between components and their operation in facsimile machine 48 is well known in the art, they will not be described in detail here.

Second network 50 comprises a wireless network, such as a Bluetooth™ network, although network 50 may also include other types of wireless and wire-based networks. Moreover, second network 50 enables laptop 32, cellular phone 44, copier machine 46, and facsimile machine 48 to communicate with each other and any other components with access to the second network 50.

The operation of the system 10(2) for enabling components on arbitrary networks to communicate in accordance with embodiments of the present invention will now be described with reference to FIGS. 9-13. In this example, referring now to FIG. 3 and FIGS. 11-12, steps 100-500 are performed in the same manner as described above in connection with FIGS. 1-8, except as described herein. Further, the cellular phone 44, copier machine 46 and facsimile machine 48 implement one or more universal interfaces, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety.

Figure 9:
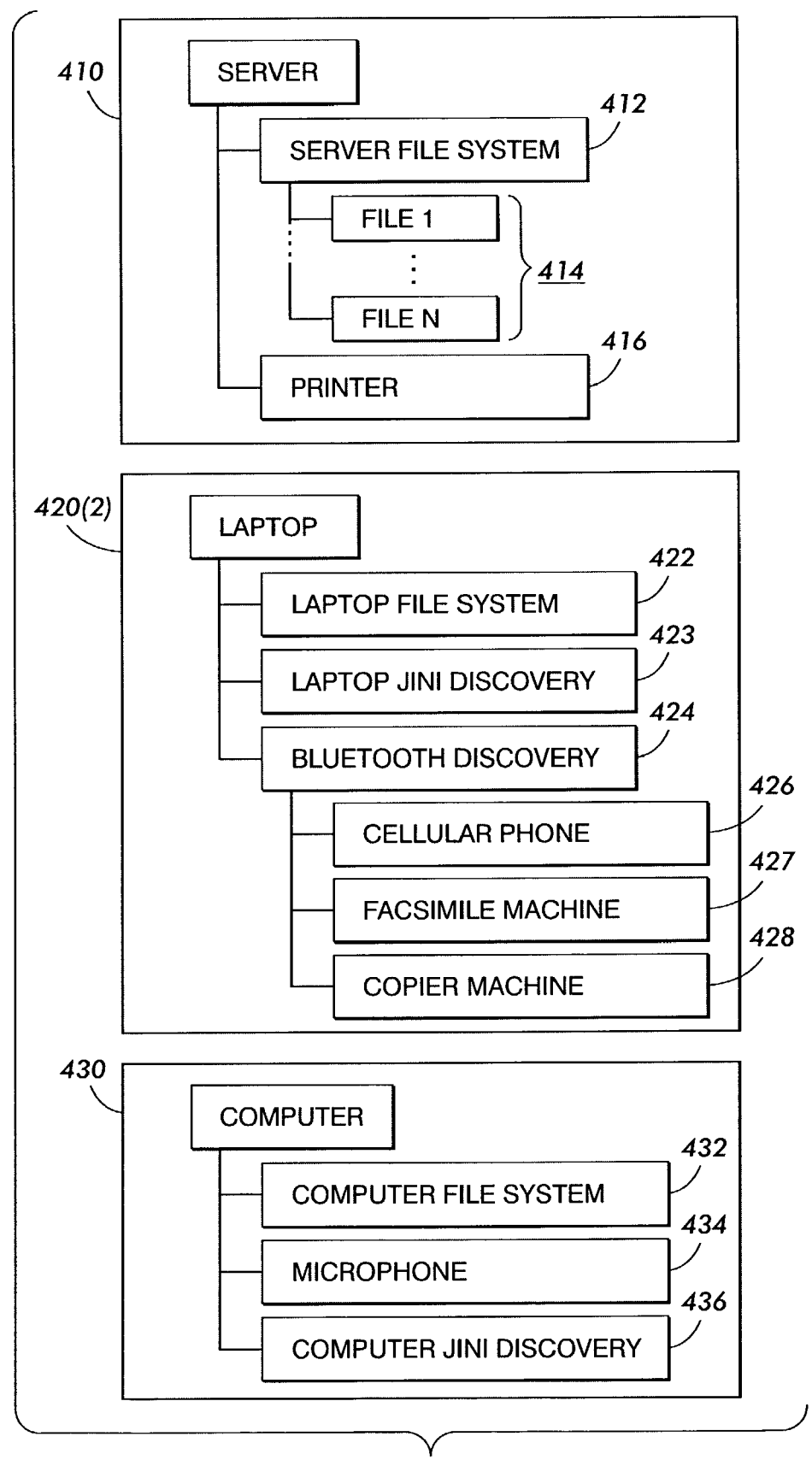
FIG. 9 is a diagram of aggregate root objects used in the system for enabling components on arbitrary networks to communicate.

At step 100, laptop 32 discovers the cellular phone 44, copier machine 46 and facsimile machine 48 using a Bluetooth™ SLP discovery protocol, in addition to the computer 12 and the server 22 discovered using the Jini™ system discovery protocol. At steps 200-400, the laptop 32 receives the server root aggregate object 410 and the computer root aggregate object 430, which are stored in the laptop memory 38. The laptop root aggregate object 420(2), constituted as shown in FIG. 9, is the same as the laptop root aggregate object 420(1), shown in FIG. 5, except laptop root aggregate object 420(2) further includes a laptop JINI™ discovery aggregate object 423 and a Bluetooth™ discovery aggregate object 424, which further includes proxy objects for cellular phone component object 426, a facsimile machine component object 427, and a copier machine component object 428, since these objects 426, 427 and 428 are discoverable via the bluetooth protocols embodied in the BlueTooth™ discovery aggregate object 424. Moreover, the laptop JINI™ discovery aggregate object 423 includes proxy objects for components (not illustrated), such as the server 22, which can be discovered using the JINI™ protocols embodied in the object 423.

Figure 10:
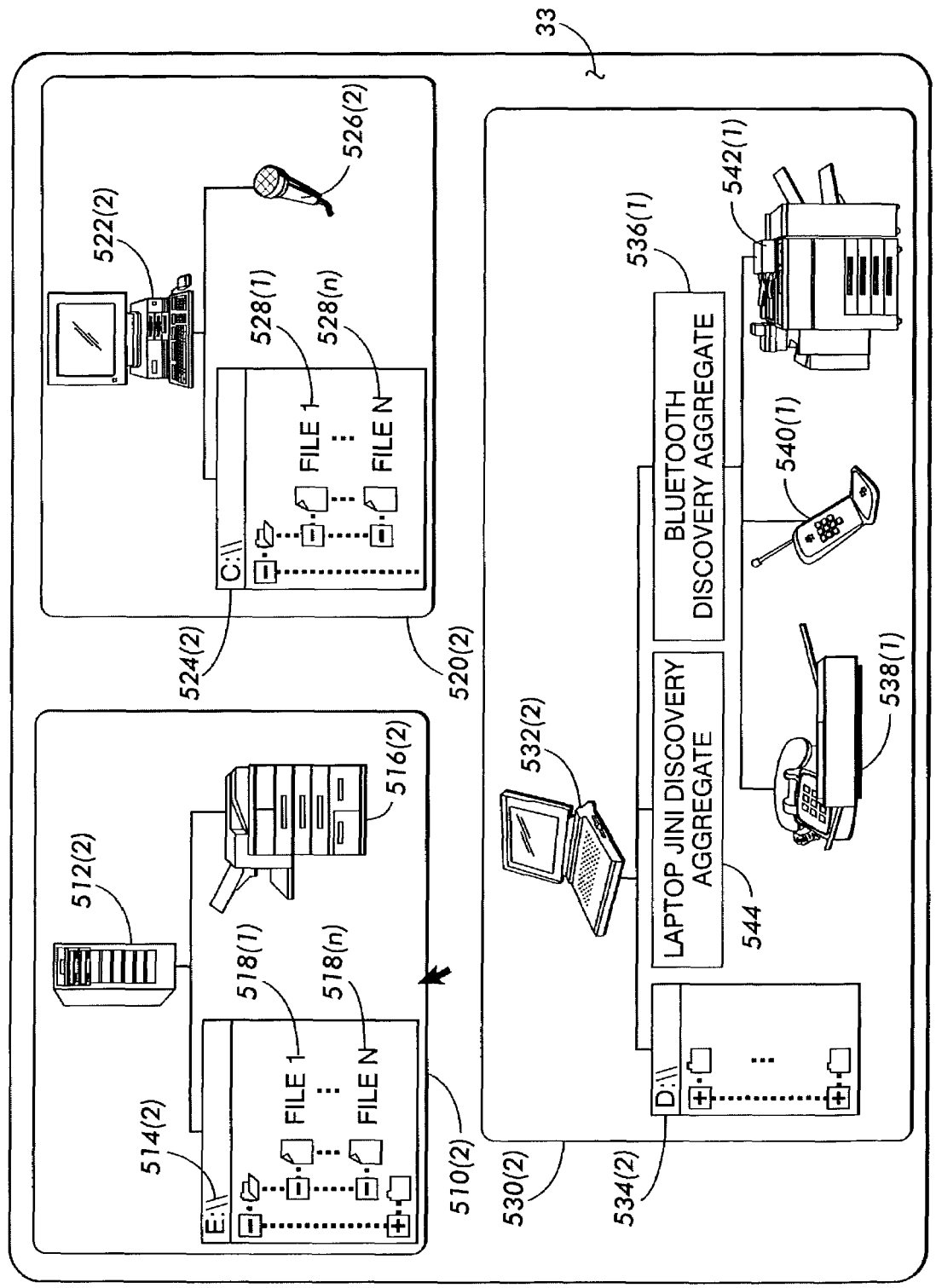
FIG. 10 is an exemplary display showing component icons used in the system for enabling components on arbitrary networks to communicate.

Referring to FIGS. 9-10, the laptop 32 accesses each of the aggregate objects 410, 420(2), 430, and displays on its laptop display 33 the components and aggregate components returned at steps 300-400 and included within root aggregate objects 410, 420(2), 430. By way of example only, the laptop 32 displays a server aggregation window 510(2), a computer aggregation window 520(2) and a laptop aggregation window 530(2). The server aggregation window 510(2) includes a server icon 512(2), a server file system icon 514(2), server file icons 518(1)-518(n), and a printer icon 516(2), although different numbers and types of icons may be used. The computer aggregation window 520(2) includes a computer file system icon 524(2), computer file icons 528(1)-528(n), and microphone icon 526(2), although different numbers and types of icons may be used. The laptop aggregation window 530(2) includes a laptop icon 532(2), a laptop file system icon 534(2), a BlueTooth™ discovery aggregate icon 536(1), a facsimile machine icon 538(1), a cellular phone icon 540(1), a copier machine icon 542(1), and a laptop JINI™ discovery aggregate icon 544, although different numbers and types of icons may be used.

Figure 11:
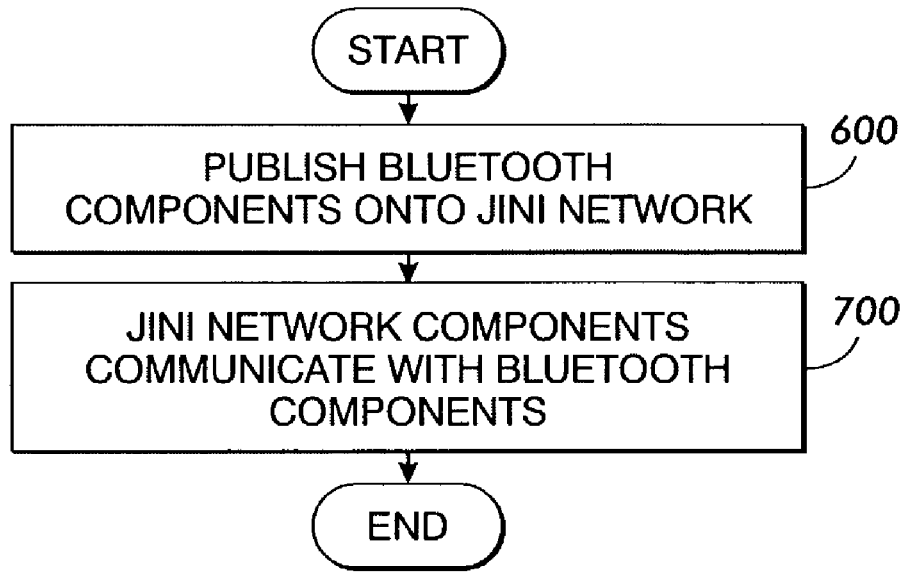
FIGS. 11-12 are flow charts of processes for enabling components on arbitrary networks to communicate in accordance with embodiments of the present invention.

Referring to FIG. 11 and at step 600, a user at laptop 32 may decide to make one or more of the BlueTooth™ components, such as cellular telephone 44, copier machine 46 and facsimile machine 48, accessible to the components on the first network 40, such as the computer 12 and the server 22. In this example, the user may move a BlueTooth™ discovery aggregate icon 536(1) over any one of icons 512(2)-516(2), 522(2)-526(2) and 528(1)-528(n). Further in this example, the user may drag and drop the BlueTooth™ discovery aggregate icon 536(1) over the laptop JINI™ discovery aggregate icon 544, which graphically represents components, such as components on the network 40, that may be discovered by the laptop 32 using the JINI™ discovery protocol. In response, the laptop 32 may execute a publish ( ) operation associated with the Jini aggregate object 423, which logically "adds" the BlueTooth™ discovery aggregate object 424 to the JINI™ discovery aggregate object 423.

The user can also drag individual component icons, such as cellular phone icon 540(1), onto the laptop JINI™ discovery aggregate object 544. This action causes the laptop 32 to invoke a publish ( ) operation on the Jini aggregate object 423, which makes the cellular phone 44 accessible via the Jini discovery protocols. Of course, the second network 50, which in this particular example, is a BlueTooth™ network, uses a non-TCP/IP wireless transport, whereas the first network 40, which is a Jini network in this particular example, uses a TCP/IP transfer protocol. Normally, components on the second network 50 would not be usable by components that do not have BlueTooth™ network adapters, such as the laptop network adapter 42, present on them. In this invention, however, the BlueTooth™ discovery aggregate object 424 generates a proxy for the laptop 32 that can be used by the laptop 32 or other components or clients, such as the computer 12, on different networks, such as the first network 40. This proxy communicates over the first network 40, a TCP/IP network, with the BlueTooth™ discovery aggregate object 424 itself, which resides on a component, such as laptop 32 having access to both networks 40, 50, and the aggregate then forwards communication on to the second network 50 component, which is a BlueTooth™ component in this particular example. Using this invention, an aggregate, such as an aggregate object 424, can bridge between two networks 40, 50 using different protocols or even different physical transports, in a way that is transparent to the applications using the components, such as cellular phone 44, provided by the aggregate. To do this, the aggregate object 424 effectively generates a new proxy for the component or device, such as the cellular phone 44, which is usable to communicate with the original device, such as the laptop 32, by using the aggregate itself as a bridge between the two networks 40, 50.

Figure 13:
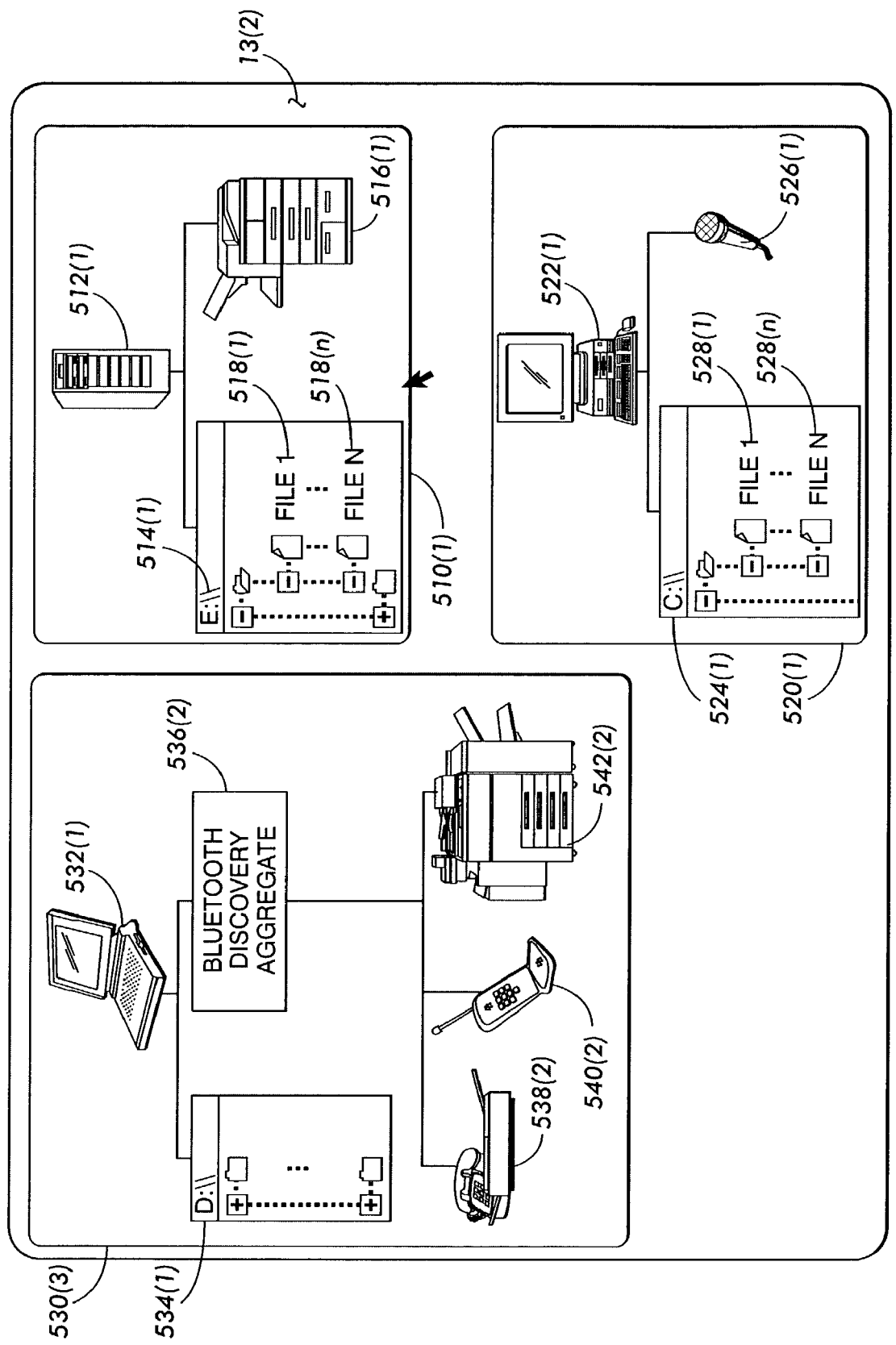
FIG. 13 is an exemplary display showing component icons used in the system for enabling components on arbitrary networks to communicate.

At step 700, computer 12 performs the same process as laptop 32 described above in connection with steps 100-400, but at step 400, computer 12 generates computer display 13(2), as shown in FIG. 13. In this example, the computer display 13(2) shows the server aggregate window 510(1) and the computer aggregate window 520(1), but here the display 13(2) shows the laptop aggregate window 530(3) further including a bluetooth discovery aggregate icon 536(2), a facsimile machine icon 538(2), a cellular phone icon 540(2) and a copier machine icon 542(2), which represent the BlueTooth™ components accessible to the laptop 32 on the second network 50, which are now accessible to the computer 12, as described in connection with steps 600-700.

By way of example only, a user at the computer 12 may drag and drop a first computer file icon 528(1) onto the facsimile machine icon 538(2). In response, the computer 12 may perform step 500, as described above, and invoke an interface, such as a data sink interface associated with the facsimile machine 48, to establish a data transfer. The data transfer enables the computer 12 to send the facsimile machine 48 data represented by the computer file icon 528(1), and the facsimile machine 48 sends a facsimile of the data. The computer 12 may provide data type handlers that the facsimile machine 48 may use to understand and know what to do with the data received from the computer 12, as disclosed in U.S. patent application Ser. No. 10/212,375 to Edwards et al., titled "A METHOD AND SYSTEM FOR HANDLING DATA," filed concurrently herewith, which is hereby incorporated by reference in its entirety. Moreover, the facsimile machine 48 may provide the computer 12 with controller objects, such as for changing facsimile machine settings or providing a fax number, as disclosed in U.S. patent application Ser. No. 10/212,376 to Edwards et al., titled "SYSTEM AND METHOD FOR CONTROLLING COMMUNICATION," filed concurrently herewith, which is hereby incorporated by reference in its entirety.

An alternative embodiment of system 10(2) will now be described with reference to FIGS. 7-10 and 12. By way of example only and referring to FIG. 9, a user at computer 12 may desire sending a file associated with the file component objects 414 that are associated with the server root aggregate object 410, represented on the computer display 13(2) as server file icon 518(1), to a device that is physically located near the laptop 32 and which can render the contents of the first file component object 414, such as copier machine 46. Thus, steps 100-700 are performed as described above.

Figure 12:
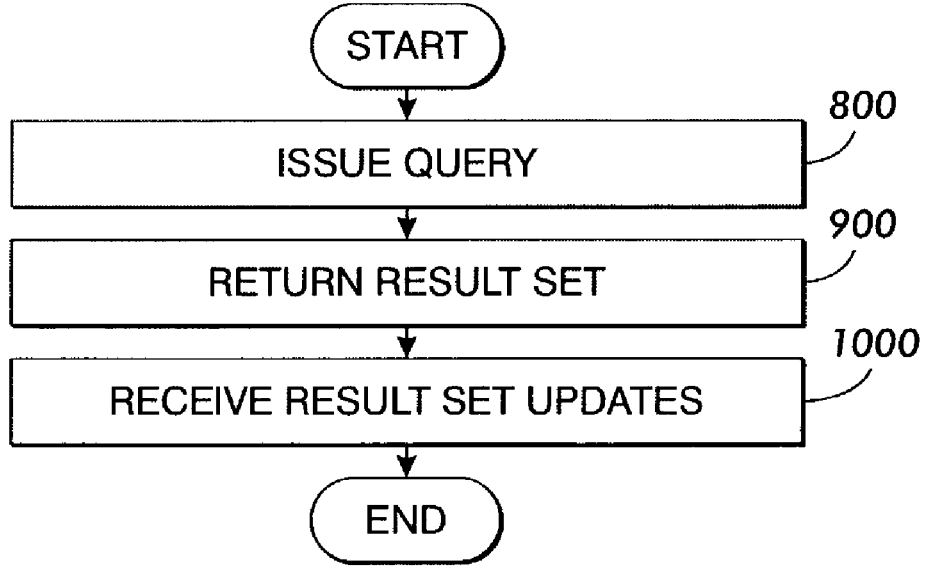

Referring to FIG. 12 and at step 800, a user at the computer 12 may enter a query using a command line interface, although a number of other types or user input or programmatic interfaces ("APIs") may be used. By way of example only, the user may enter a query, such as "Search for components located within twenty feet of the laptop 32 that can quickly render documents." Moreover, the user may specify the extent the query should pervade a root object, such as the laptop root aggregate object 420(2), since recursive methods may be used to perform the searches. For example, the user may specify in the query that the search should involve local aggregate components and local individual components of the components discovered by the computer 12 at step 100, such as the server 22 and the laptop 32, but not components that are discovered remotely by those components. The computer 12 is programmed to create a query object including search constraints entered by a user. The computer 12 may then execute the contains ( ) operation included in the aggregation interface associated with each of the components discovered at step 100, passing along the query object into the operation call. The components, such as the server 22 and the laptop 32, may be programmed to inspect the query object and to return components matching the constraints in the query object.

In embodiments of the present invention, a query object may comprise multiple constraints or search terms. Once a query has been issued and propagated throughout the components in a network, such as networks 40, 50, the application that originally issued the query, such as the computer 12, may change the individual constraints associated with it. This change may then be propagated throughout the networks 40, 50, causing the query to potentially match a different set of components. As an example, a user at the laptop 32 may wish to express the query concept "Find all copiers near where the computer 12 user is right now." A computer 12 user would access a query interface operating on the computer 12 and input the query, as described above in connection with step 800. The laptop 32 would parse the input query and create a query object that includes the query, again as described above at step 800. Such a query might be constructed by determining the user's current location. To determine a user's location, a number of location detection systems may be used, such as GPS systems, wireless tracking services or Beacon technology, which would be coupled to the laptop I/O unit 36. In this example, the location system may report to the laptop 32 the user's current location within a building, such as a break room, for instance. The user's location may then be reported and stored at a location accessible by the computer 12, such as the server 22.

When the computer 12 receives the user's location information, the computer 12 may be programmed to generate a query such as "type==copier && location==break room." Then, as the user changes location and moves to his office, for example, the location detection system would report the user's location to the laptop 32, and hence the computer 12, and in response, the computer 12 would change the "location" query term to reflect the user's new location, causing the new query to be "type==copier && location==office." The individual constraints in this query could be repeatedly updated to reflect the user's current location as they move throughout a building, for instance, and the updated query would be re-sent by the computer 12, and thus be propagated to the components on the network 40 to match and return a result set including the appropriate set of components matching the constraint, as described above.

In embodiments of the present invention, entirely new types of queries can be added through the use of mobile code. For example, one or more components on the network 40, such as the laptop 32, might support a set of predefined query terms such as "equals," "less than" or "greater than," which allow numeric comparisons in queries. Users or applications operating on the components, such as the computer 12, could create entirely new query operators, however, and generate queries using them. For instance, a user or application or computer 12 may create a new query operator for "notInUse," which matches components on the network 40 that currently are not in use. These new operators may be implemented using mobile code, and are included in the query object, and thus propagated throughout the network 40. Thus, components, such as the server 22 or the laptop 32, that receive the query object, may be programmed to inspect the query object to look for mobile code that it can execute to understand any unknown operators it may encounter, such as the "notInUse" operator, when examining the query object. The mobile code instructions for the new query term may be usable in any query and may execute on any system, as described further herein at step 900.

At step 900, the components, such as the server 22 and the laptop 32, receive the query object from the computer 12, and call the appropriate operations associated with the one or more discovery protocols each component has access to, passing along the query object. For instance, the laptop 32 examines the components it can discover against the search constraints using the Jini™ discovery protocol is has been programmed to implement. This process may be performed recursively, limited by constraints included in the query object or system constraints, for example. Moreover, the laptop 32 examines the components it can discover using the BlueTooth™ discovery protocol in the same manner described above with respect to the Jini™ discovery protocol, except the laptop 32 executes BlueTooth™ specific instructions and protocols. If the server 22 or the laptop 32 encounter any unknown query operators in the object, the laptop 32 will further inspect the query object to look for any mobile code that may be available so the laptop 32 will be able to understand and execute the unknown query operator. Search result set objects are returned to the computer 12 by each of the components, such as server 22 and laptop 32. Thus in this example, one of the search result set objects returned to the computer 12 includes the copier machine component object 428, since it matched the search constraint provided in the query object set forth above at step 800, such as components located within twenty feet of the laptop 32.

At step 1000, the computer 12 may be programmed to perform step 800 at set periods of time to determine whether any of the result sets have changed. For instance, while the laptop 32 may still have access to the first network 40, the physical location of the laptop 32 may change. Therefore, given the query constraints provided by the computer 12 set forth above at step 800, the result set associated with the bluetooth discovery aggregate component object 424 may contain different results, since the laptop 32 may be physically located from the copier machine 46 a distance over twenty feet, thereby not meeting the constraints set forth at step 800. Alternatively, the computer 12 may register with the laptop 32 to cause the laptop to send asynchronous notifications to the computer 12 when new components are discovered using the BlueTooth™ discovery protocol, or when components are no longer discoverable.

Figure 7:
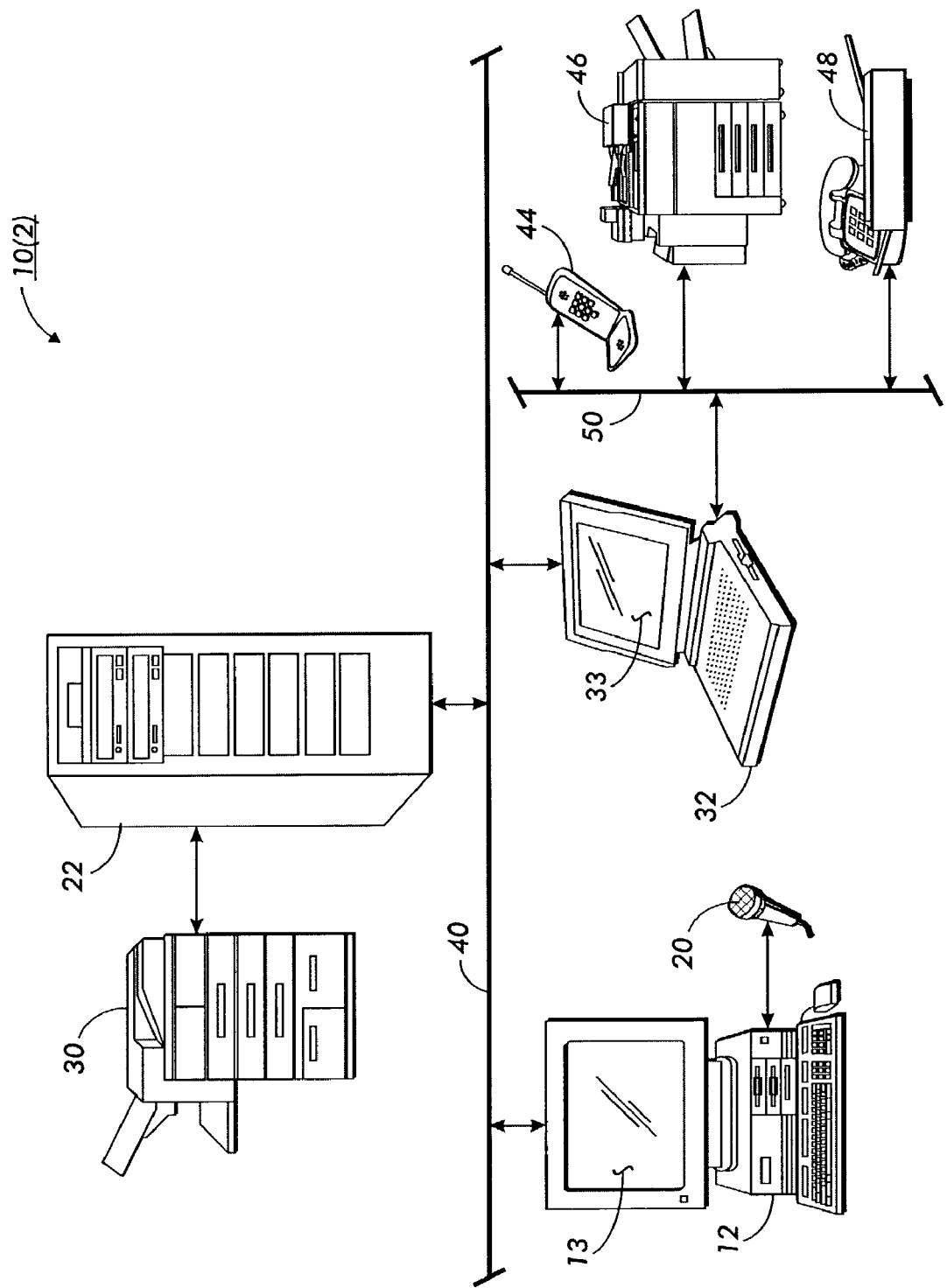
FIG. 7 is a diagram of a system for enabling components on arbitrary networks to communicate in accordance with embodiments of the present invention.

An alternate embodiment of system 10(2) will now be described with reference to FIG. 7. By way of example only, in this embodiment the server 22 is operating a Web service, such as a payment processing Web site (not illustrated), which can be discovered by any component on network 40 that implements a UDDI discovery protocol, such as the laptop 32 or the computer 12. Also in this example, the laptop 32 is operating a UDDI aggregate component object (not illustrated), which includes instructions that can be executed by other entities or components using the UDDI discovery protocol, such as the computer 12. Laptop 32 performs steps 100-400, except at step 400, the UDDI discovery aggregate component object on laptop 32 generates a wrapper proxy object for the Web service running on server 22. This wrapper proxy object includes instructions that can be executed by components, such as the computer 12, to communicate with the Web service on server 22 using the protocol understood by the Web service. When a user at a component, such as the computer 12, wishes to communicate with the service on server 22, the generated proxy object handles the communication. In this way, "legacy" services, or components, such as the computer 12 in this particular example, which may not implement one or more of the universal interfaces described in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety, are able to communicate with services that do implement one or more of the above referenced universal interfaces, such as the server 22.

An alternate embodiment of system 10(2) will now be described with reference to FIGS. 7 and 8. In this embodiment the second network 50 is a virtual private network ("VPN"), instead of a Bluetooth™ network, although other types of networks may be used. Further, the laptop 32 is operating a UDDI aggregate component object (not illustrated), as described above, which includes instructions that can be executed by other components, such as the computer 12, to discover entities or components on the second network 50, such as the cellular phone 44, copier 46 and facsimile machine 48. By way of example only, a user at a component on the first network 40, such as the computer 12, may wish to print a file stored within the laptop memory 38 using the copier machine 46 on the second network 50.

Thus, laptop 32 performs step 100 to execute the Blue-Tooth™ discovery protocol to discover components on the second network 50. At step 200, the laptop 32 executes the instructions included in the UDDI component aggregate object, and laptop 32 receives a first proxy object (not illustrated) from the components on the second network 50, such as the copier machine 46, except the laptop 32 then generates a wrapping proxy object (not illustrated) that "wraps" the first proxy object and further, is capable of operating on network 40. The wrapping proxy object operating on network 40 then communicates with the printer 46 by communicating with the aggregate component object, which then communicates with the printer 46 on network 50, although the wrapper proxy object may communicate with the printer 46 directly.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefore, is not intended to limit the claimed processes to any order except as may be specified in the claims.

What is claimed is:

1. A method comprising:
   obtaining and distributing a first aggregate object from a first component of a plurality of components, wherein the first aggregate object includes mobile code that can be used to enable communication among the first component and other components on a network that the first component has access to;
   selecting at least one of the components associated with the first aggregate object for receiving the distributed mobile code; and
   invoking at least one of a plurality of universal interfaces associated with the at least one selected component to communicate with at least one other of the components without requiring the components to have knowledge about the communication protocols;
   wherein obtaining the first aggregate to object involves receiving mobile code from the first component that can be used access the first component and other components that the first component has access to;
   wherein the received mobile code is executable on any platform regardless of operating system and hardware architecture;
   wherein invoking the at least one of the plurality of universal interfaces to communicate with the at least one other of the components on the network involves executing mobile code contained within the first aggregate object;
   wherein the mobile code is an executable program that can be executed on the receiving component;
   wherein the executable mobile code supports predetermined and new types of queries with respect to the aggregates object, the new types of queries including a new query operator which matches components not in use; and
   wherein the executable mobile code is propagated throughout the components of the network.

2. The method as set forth in claim 1 wherein at least one of the components is on a first network.

3. The method as set forth in claim 2 further comprising publishing the at least one component onto a second network.

4. The method as set forth in claim 1 further comprising associating a wrapper proxy object with at least one component in the first aggregate object, the wrapper proxy object having at least one mobile code instruction, which when executed by at least one legacy component, enables the legacy component to communicate with the at least one component.

5. The method as set forth in claim 1 further comprising associating a wrapper proxy object with at least one component in the first aggregate object, the at least one component being on a first network, the wrapper proxy object having at least one mobile code instruction, which when executed by at least one other component on a second network, enables the at least one other component to communicate with the at least one component on the first network.

6. The method as set forth in claim 1 further comprising:
   obtaining a second aggregate object from a second component of the plurality
   of components, the obtained second aggregate object associated with at least one of the components;
   selecting at least one of the components associated with the second aggregate object; and
   invoking at least one of a plurality of universal interfaces associated with the at least one selected component associated with the second aggregate object to communicate with the at least one other of the components.

7. The method as set forth in claim 1 wherein obtaining a first aggregate object further comprises using a first discovery protocol to locate the first component.

8. The method as set forth in claim 7 further comprising obtaining a second aggregate object from a second component using a second discovery protocol.

9. The method as set forth in claim 1 further comprising querying the obtained first aggregate object to locate at least one component matching at least one query constraint.

10. The method as set forth in claim 9 wherein querying the obtained first aggregate object is performed recursively.

11. The method as set forth in claim 9 wherein the at least one query constraint in a query is modified to include at least one updated constraint.

12. The method as set forth in claim 1 further comprising sending a query object to at least one of the components, the query object having at least one mobile code instruction, which when executed by the at least one component, enables the component to understand and execute a first type of query operator.

13. A computer-readable medium having stored thereon instructions, which when executed by at least one processor, causes the processor to perform:
   obtaining and distributing a second aggregate object from a second component of the plurality of components, wherein the first aggregate object includes mobile code that can be used to enable communication among the first component and other components on a network that the first component has access to;
   selecting at least one of the components associated with the second aggregate object for receiving the distributed mobile code; and
   invoking at least one of a plurality of universal interfaces associated with the at least one selected component associated with the second aggregate object to communicate with the at least one other of the components without requiring the components to have knowledge about the communication protocols;
   wherein obtaining the first aggregate object involves receiving mobile code from the first component that can be used to access the first component and other components that the first component has access to;

wherein the received mobile code is executable on any platform regardless of operating system and hardware architecture;

wherein invoking the at least one of the plurality of universal interfaces to communicate with the at least one other of the components on the network involves executing mobile code contained within the first aggregate object; and wherein the mobile code is a program that can be executed on the receiving component;

wherein the executable mobile code supports predetermined and new types of queries with respect to the aggregate object, the new types of queries including a new query operator which matches components not in use; and wherein the executable mobile code is propagated throughout the components of the network.

14. The medium as set forth in claim 13 wherein at least one of the components is on a first network.

15. The medium as set forth in claim 14 further comprising publishing the at least one component onto a second network.

16. The medium as set forth in claim 13 further comprising associating a wrapper proxy object with at least one component in the first aggregate object, the wrapper proxy object having at least one mobile code instruction, which when executed by at least one legacy component, enables the legacy component to communicate with the at least one component.

17. The medium as set forth in claim 13 further comprising associating a wrapper proxy object with at least one component in the first aggregate object, the at least one component being on a first network, the wrapper proxy object having at least one mobile code instruction, which when executed by at least one other component on a second network, enables the at least one other component to communicate with the at least one component on the first network.

18. The medium as set forth in claim 13 farther comprising:
obtaining a second aggregate object from a second component, the obtained second aggregate object associated with the at least one component;
selecting at least one of the components associated with the second aggregate object; and
invoking at least one of a plurality of universal interfaces associated with the at least one selected component associated with the second aggregate object to communicate with at least one other of the components.

19. The medium as set forth in claim 13 wherein obtaining a first aggregate object further comprises using a first discovery protocol to locate the first component.

20. The medium as set forth in claim 19 further comprising obtaining a second aggregate object from a second component using a second discovery protocol.

21. The medium as set forth in claim 13 further comprising querying the obtained first aggregate object to locate at least one component matching at least one query constraint.

22. The medium as set forth in claim 21 wherein querying the obtained first aggregate object is performed recursively.

23. The medium as set forth in claim 21 wherein at least one of the at least one query constraint in a query is modified to include at least one updated constraint.

24. The medium as set forth in claim 13 further comprising sending a query object to at least one of the components, the query object having at least one mobile code instruction, which when executed by the at least one component, enables the component to understand and execute a first type of query operator.

* * * * *